(12) United States Patent
Jarry et al.

(10) Patent No.: US 10,781,137 B2
(45) Date of Patent: Sep. 22, 2020

(54) FIBERGLASS MATERIAL MANUFACTURE METHOD COMPRISING STEPS OF SIZING AND DESIZING, AND FACILITY SUITABLE FOR IMPLEMENTING SAID METHOD

(71) Applicant: L'Air Liquide, Societe Anonyme pour l'Etude et l'Exploitation des Procedes Georges Claude, Paris (FR)

(72) Inventors: Luc Jarry, Beaufai (FR); Youssef Joumani, Crespieres (FR); Gregoire Beasse, Paris (FR)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 224 days.

(21) Appl. No.: 15/749,295

(22) PCT Filed: Jul. 28, 2016

(86) PCT No.: PCT/FR2016/051962
§ 371 (c)(1),
(2) Date: Jan. 31, 2018

(87) PCT Pub. No.: WO2017/021624
PCT Pub. Date: Feb. 9, 2017

(65) Prior Publication Data
US 2018/0230047 A1    Aug. 16, 2018

(30) Foreign Application Priority Data

Jul. 31, 2015    (FR) ...................................... 15 57422

(51) Int. Cl.
*C03B 37/04* (2006.01)
*C03C 25/002* (2018.01)
(Continued)

(52) U.S. Cl.
CPC ............ *C03C 25/002* (2013.01); *C03B 5/237* (2013.01); *C03B 5/2353* (2013.01); *C03B 37/04* (2013.01);
(Continued)

(58) Field of Classification Search
CPC . C03B 37/01208; C03B 37/022; C03B 37/07; C03B 37/048
See application file for complete search history.

(56) References Cited

U.S. PATENT DOCUMENTS 2,633,428 A    3/1953  Klug
2,665,125 A    1/1954  Klug
(Continued)

FOREIGN PATENT DOCUMENTS

DE    10 2013 110283    3/2015
EP    0 500 923    4/1995
(Continued)

OTHER PUBLICATIONS

International Search Report and Written Opinion for PCT/FR2016/051962, dated Oct. 27, 2016.
(Continued)

*Primary Examiner* — Cynthia Szewczyk
(74) *Attorney, Agent, or Firm* — Christopher J. Cronin

(57) ABSTRACT

The invention relates to a fiberglass material manufacture method and facility, were in molten glass is converted into fiberglass material via the steps of spinning, drawing, sizing, and collecting, followed by a step of producing a resulting fiberglass material that is then subjected to thermal desizing. The fumes from the melting furnace are used to preheat a combustion reagent from the melting furnace in two steps: a first step in which air is heated via heat exchange with the fumes, and a second step in which the combustion reagent (Continued)

is preheated via heat exchange with the hot air, the air then being used in the step of desizing the fiberglass material.

14 Claims, 1 Drawing Sheet

(51) Int. Cl.
| | |
|---|---|
| *C03B 37/06* | (2006.01) |
| *C03B 5/235* | (2006.01) |
| *C03B 5/237* | (2006.01) |
| *D02J 13/00* | (2006.01) |
| *C03C 25/26* | (2018.01) |
| *D06B 3/04* | (2006.01) |
| *D06B 23/22* | (2006.01) |
| *D06B 3/02* | (2006.01) |

(52) U.S. Cl.
CPC .......... *C03B 37/048* (2013.01); *C03B 37/06* (2013.01); *C03C 25/26* (2013.01); *D02J 13/00* (2013.01); *D06B 3/04* (2013.01); *D06B 23/22* (2013.01); *D06B 3/02* (2013.01); *D10B 2101/06* (2013.01); *D10B 2401/02* (2013.01); *D10B 2401/04* (2013.01); *D10B 2401/14* (2013.01); *D10B 2505/04* (2013.01); *D10B 2505/204* (2013.01); *Y02P 40/535* (2015.11); *Y02P 40/55* (2015.11)

(56) References Cited

U.S. PATENT DOCUMENTS

| | | | |
|---|---|---|---|
| 2,845,364 A | | 7/1958 | Waggoner |
| 2,970,934 A | | 2/1961 | May |
| 3,012,845 A | | 12/1961 | Lotz |
| 4,111,672 A | * | 9/1978 | Battigelli ................ D04H 1/00 156/62.4 |
| 2010/0162772 A1 | | 7/2010 | McGinnis et al. |

FOREIGN PATENT DOCUMENTS

| | | |
|---|---|---|
| EP | 1 338 848 | 8/2003 |
| EP | 2 551 243 | 1/2013 |
| FR | 3 000 174 | 6/2014 |
| FR | 3 000 175 | 6/2014 |
| FR | 3 015 469 | 6/2015 |
| FR | 3 015 635 | 6/2015 |
| FR | 3 015 636 | 6/2015 |
| FR | 3 015 637 | 6/2015 |
| JP | 2003335555 | 11/2003 |
| WO | WO 2013/010722 | 1/2013 |

OTHER PUBLICATIONS

International Search Report and Written Opinion for PCT/FR2016/051960, dated Oct. 27, 2016.
International Search Report and Written Opinion for PCT/FR2016/051961, dated Feb. 1, 2018.

* cited by examiner

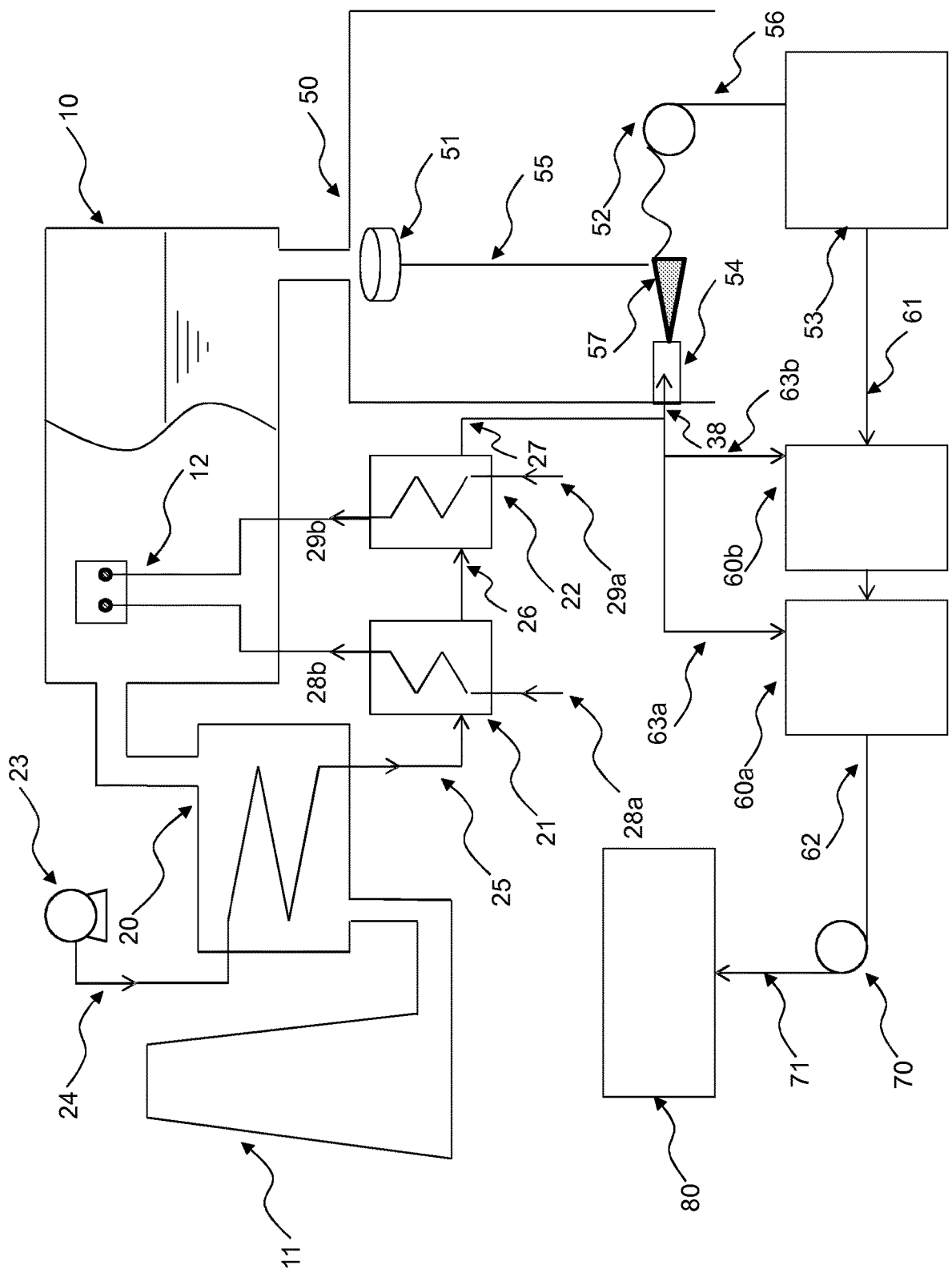

FIBERGLASS MATERIAL MANUFACTURE METHOD COMPRISING STEPS OF SIZING AND DESIZING, AND FACILITY SUITABLE FOR IMPLEMENTING SAID METHOD

CROSS-REFERENCE TO RELATED APPLICATIONS

This application is a § 371 of International PCT Application PCT/FR2016/051962, filed Jul. 28, 2016, which claims § 119(a) foreign priority to French patent application FR 1557422, filed Jul. 31, 2015.

BACKGROUND

Field of the Invention

The invention relates to the manufacture of glass fiber products.

The term "glass fiber product" is understood to mean glass fibers as such and also products containing them.

Related Art

It is known to manufacture glass fibers by a process comprising the production of molten glass in a melting furnace, the spinning by means of a bushing of streams starting from molten glass from the melting furnace, the attenuation of the streams into filaments, the sizing of the filaments, the collecting of the sized filaments and the conversion of the collected filaments into a glass fiber product.

The sizing of filaments is a common practice often essential in the manufacture of glass fiber products, such as, in particular, glass strands, glass fabrics and reinforcing fibers. This is because the sizing lubricates the filaments and protects them (in particular from abrasion) during the strand formation (manufacture of strands from fibers), during the throwing or twisting, during the texturing, during the knitting or the weaving, and the like.

However, the presence of a sizing agent on the glass fiber product often presents technical problems for the downstream treatment/use of the glass fiber product. Thus, the sizing agent may, for example, prevent effective dyeing of the glass product by blocking the fixing of the dye to the glass fibers. In the case of a reinforcing product intended to be incorporated in a matrix material, the sizing agent may prevent the anchoring of the glass fiber product in the matrix material, indeed even prevent the fixing of an anchoring agent to the glass fiber product. The size may analogously present a problem for the adhesive application and cross-linking subsequently of the filaments.

It is thus often necessary to desize the glass fiber product before the finishing (dressing) or final use thereof.

It is thus known to desize glass fiber products by thermal desizing. During thermal desizing, the glass fiber product is subjected to temperatures which bring about the volatilization and/or the combustion of the size present on the glass product.

Examples of known thermal desizing processes are described in U.S. Pat. Nos. 2,633,428, 2,665,125, 2,845,364, 2,970,934 and 3,012,845.

SUMMARY OF THE INVENTION

It is an aim of the present invention to provide a process for the manufacture of glass fiber products which is optimized as less energy-consuming.

An aim of the present invention is more particularly to provide such an optimized manufacturing process without a negative effect on the quality of the glass fiber products.

According to the present invention, this is produced in particular by better energy integration of the phase of molten glass production and the phase of conversion of the molten glass into a glass fiber product.

Another aim of the present invention is to provide a suitable plant for the implementation of such an optimized process.

In the manufacturing process according to the invention, molten glass is converted into a glass fiber product. This conversion comprises the following stages:

spinning the molten glass into at least one stream,
attenuating the at least one stream into one or more filaments,
sizing the filament or filaments,
collecting the sized filament or filaments,
producing the glass fiber product by means of the collected sized filament or filaments, and
thermal desizing of the glass fiber product, that is to say a stage of desizing by volatilization and/or combustion of a sizing agent applied to the filament or filaments during the sizing.

The molten glass to be converted into the glass fiber product is produced in a melting furnace heated by combustion of a fuel with a rich oxidizer. In the present context, the term "rich oxidizer" is understood to mean a gas having an oxygen content of 80 vol % to 100 vol %. The combustion generates heat for the melting and flue gases. The flue gases generated are discharged from the melting furnace at a temperature between 1000° C. and 1600° C.

The combustion with a rich oxidizer heats the melting furnace with a high efficiency.

It should be noted that the heating of the melting furnace by combustion of a fuel with a rich oxidizer does not exclude the furnace from also being heated by additional means, such as, for example, electrodes.

According to the invention, a first energy optimization of the manufacturing process is carried out:

in that air is heated by heat exchange with discharged flue gases in a heat-exchange assembly with hot air being obtained,
in that a reactant is preheated by heat exchange with the hot air in the heat-exchange assembly with the production of preheated reactant and of moderated air at a temperature between 200° C. and 500° C., and
in that the preheated reactant is used as combustion reactant in the furnace.

The reactant is chosen from rich oxidizers and gaseous fuels. According to a preferred embodiment, a rich oxidizer is preheated before it is used in the furnace. It is also possible to preheat both a rich oxidizer and a gaseous fuel before they are used in the furnace. In this case, the preheating of the two reactants can be carried out in series or in parallel.

A second energy optimization of the manufacturing process is carried out in that the moderated air resulting from the heat-exchange assembly is employed during the conversion of the molten glass into a glass fiber product, so as to make use of the residual heat still present in this moderated air.

Moderated air resulting from the heat-exchange assembly is more particularly employed during the desizing of the glass fiber product, preferably by bringing moderated air into contact with the glass fiber product in order to promote the volatilization and/or the combustion of the size present on the glass fiber product.

It is also possible to use moderated air during the desizing as oxidant for the heating by combustion of a desizing furnace in which the glass product is brought to its desizing temperature.

According to the present invention, an energy synergy is thus produced between the melting and the conversion of the molten glass downstream of the melting in that moderated air resulting from the heat-exchange assembly is employed during the desizing of the glass fiber product.

Moderated air can also be employed in one or more other stages of the conversion of the molten glass.

The present invention thus also covers processes combining the use of moderated air resulting from the heat-exchange assembly during the desizing stage, as described above, with one or more other uses of moderated air resulting from the heat-exchange assembly.

Thus, moderated air can advantageously also be employed during the stage of the sizing, for example by using moderated air as spraying agent for the sizing agent.

When the conversion comprises a stage of drying the filament or filaments or strands containing them, moderated air can be employed as drying agent in contact with the filament or filaments or strands. The drying of the filaments can in particular be of use in order to fix the sizing agent to the sized filaments by evaporation or volatilization of water or of another solvent present in the sizing agent.

Moderated air can also be employed during the attenuation of the stream.

A distinction is made between:

a) mechanical attenuation by means of a winder or analogous winding member, b) attenuation by gas friction by means of one or more gas attenuation currents, and c) centrifugal attenuation by means of a centrifuge.

Centrifugal attenuation is in industrial practice generally combined with attenuation by gas friction.

According to a first embodiment of the attenuation by gas friction, also known as flame attenuation, the glass stream is cooled and solidifies, with a glass rod being obtained. The glass rod is introduced into a flame. The end of the rod is thus melted and subsequently attenuated by the combustion gases of the flame, so as to form one or more glass wool filaments. Flame attenuation makes it possible to produce very fine glass fibers but exhibits the disadvantage of consuming a great deal of energy, in particular because of the twofold melting of the glass. Flame attenuation is generally used for products of high added value.

According to a second process of attenuation by gas friction, which is slightly less energy-consuming, also known as gas attenuation, the molten glass stream is directly, that is to say without passing through a solidified phase, impacted by one or more currents or jets of attenuation gas, such as a current of steam or of combustion gas.

According to a known process, combining centrifugal attenuation and attenuation by gas friction, the molten glass stream is introduced into a centrifuge and is converted by centrifugal force into a large number of molten glass filaments. Said filaments are subsequently attenuated by a cylindrical curtain of attenuation gas which surrounds the centrifuge. The latter process provides most of the production of glass fibers for insulation.

In order for the attenuation by gas friction to be effective, the viscosity of the glass during the attenuation has to be sufficiently low, which in its turn requires that the attenuation gas be very hot and makes it possible to bring the glass to and/or maintain it at a high temperature corresponding to a low viscosity.

Moderated air resulting from the heat-exchange assembly can thus also be used for the production of one or more attenuation gas currents or for the production of one or more attenuation flames, as described in more detail in the unpublished patent application FR 1 557 344. This makes possible a significant reduction in the energy consumption of the attenuation stage of the process.

When the conversion of the molten glass into a glass fiber product comprises a stage of texturing of the filaments or of the strands containing them, moderated air can be used as texturing gas current and more particularly as texturing air turbulent jet.

In the present context, "heat exchange" between two fluids of different temperatures is understood to mean the transfer of heat or thermal energy from one of the two fluids (hotter fluid) toward the other of the two fluids (cooler fluid) through one or more walls without the two fluids coming into direct contact or mixing.

"Heat exchanger" or "exchanger" is understood to mean a plant or a device in which two fluids of different temperatures move in separate chambers or circuits without direct contact or mixing between the two fluids, in which plants or devices heat is transmitted from the hottest fluid to the coolest fluid through one or more walls separating the two chambers or circuits. The term "filament" refers to an attenuated stream.

The heat-exchange assembly advantageously comprises a primary exchanger and a secondary exchanger. Air is then heated by heat exchange with flue gases discharged from the furnace in the primary exchanger and the reactant is preheated in the secondary exchanger by heat exchange with the hot hair resulting from the primary exchanger.

According to one embodiment, the heat-exchange assembly comprises a primary exchanger and a secondary exchanger, air being heated by heat exchange with flue gases discharged from the furnace in the primary exchanger, with hot air at a temperature between 500° C. and 800° C. being obtained, and the combustion reactant is preheated in the secondary exchanger by heat exchange with hot air resulting from the primary exchanger.

Preferably, at least one rich oxidizer is preheated in the secondary exchanger upstream of the use thereof in the furnace.

The desizing of the glass fiber product generally includes the heat treatment of the glass fiber product in a desizing furnace.

The desizing furnace can be heated by combustion and in particular by combustion of a fuel with moderated air resulting from the heat-exchange assembly. However, the desizing furnace is often heated by means of electrical heating elements.

The temperature in the desizing furnace depends on the nature of the sizing agent and on the desizing process.

Thus, in a furnace for desizing by volatilization, the temperature in the desizing furnace is controlled so as to make possible the at least partial volatilization of the sizing agent without, however, reaching the temperature of self-ignition of the sizing agent in the presence of the moderated air resulting from the heat-exchange assembly.

In a furnace for desizing by combustion, the temperature in the desizing furnace is controlled so as to reach, in at least a portion of the desizing furnace, the temperature of self-ignition of the sizing agent in the presence of the moderated air resulting from the secondary exchanger.

In both cases, the temperature in the desizing furnace is maintained below a predetermined threshold ($T_{max}$) in order to limit the negative impact of the desizing on the mechanical strength of the glass fiber product.

Analogously, the duration of the desizing heat treatment is regulated so as to be long enough to reach the desizing level required without, however, reaching a predetermined duration (Δtmax) at which the mechanical strength of the product would be unacceptably reduced.

The temperature for desizing by volatilization is preferably located in the range from 250° C. to 380° C. The temperature for desizing by combustion is advantageously located in the range from 475° C. to 820° C.

According to a specific embodiment of the invention, the desizing comprises a first stage of desizing by volatilization of the glass fiber product, followed by a stage of desizing by combustion of the glass fiber product. The two successive stages can take place in just one desizing furnace, indeed even in two successive desizing furnaces. Moderated air resulting from the heat-exchange assembly can be brought into contact with the glass fiber product during one of the two stages or during the two successive stages A desizing stage can be a continuous desizing stage, that is to say a stage in which the glass fiber product continuously passes through the desizing furnace. A desizing stage can also be a batchwise desizing stage. It is also possible to combine a batchwise desizing stage and a continuous desizing stage. In particular, the desizing by combustion is preferably a continuous desizing.

By virtue of the thermal energy present in the moderated air resulting from the heat-exchange assembly, the use of moderated air during the desizing stage according to the present invention makes possible a major saving in heating energy during the desizing and/or a shorter duration of the desizing stage, in particular when the glass fiber product is swept by a current of moderated air resulting from the heat-exchange assembly. It should also be noted that the present invention makes it possible to achieve these advantages without a negative impact on the mechanical strength of the glass fiber product.

After the desizing stage, the glass fiber product can be subjected to a finishing or dressing stage, in particular in order to carry out a finishing for which the presence of size on the glass fiber product would be problematic.

Thus, the finishing stage can be or include a dyeing stage, the desizing making possible better coverage of the product with the dye and/or better fixing of the dye to the product. The dyeing is advantageous in particular for pure or mixed glass fiber textile products. The glass fiber textile products include glass fiber woven fabrics, glass fiber nonwoven fabrics, glass fiber knitted fabrics and the like.

The finishing stage can also be or include the application of an adhesive agent to the glass fiber product. The desizing makes possible better coverage of the product with the adhesive agent and/or better fixing of the adhesive agent to the glass product, the adhesive agent subsequently making possible better adhesion between the glass product and another material, often known as matrix. The application of an adhesive agent is advantageous in particular for glass fiber reinforcing products, such as, in particular, reinforcing fibers or strands and reinforcing fabrics. The adhesive agent is generally chosen according to the nature of the matrix. Glass fiber reinforcing products have a very large number of applications, such as, for example: the reinforcing of brake linings, of printed circuit boards, of roof shingles, of injection molded parts, as covering for pipes or tanks, and the like. For certain matrices/certain applications, the desizing makes possible, as such, sufficient adhesion between the glass fiber product and the matrix.

The finishing stage can also be or include the application of an adhesive to the glass fiber product in order to adhesively bond several glass fiber products to one another or to adhesively bond together the glass fibers present in the glass fiber products, such as, for example, in the case of a glass fiber filtration sheet.

Another example of a finishing stage is the waterproofing of the glass fiber product.

In order to improve the homogeneity of the glass stream and thus the homogeneity and the quality of the filament or filaments obtained by attenuation of the stream, the molten glass can be refined before the spinning.

The melting and the refining of the glass can then take place in one and the same melting/refining chamber of the furnace, the refining zone then being located downstream of the melting zone and upstream of the molten glass outlet in the direction of flow of the glass.

The melting and the refining can also take place in separate chambers of the melting furnace, the refining chamber being located downstream of the melting chamber. It is then considered that the melting furnace encompasses these two chambers.

According to one embodiment, the molten glass is extruded immediately at the outlet of the melting furnace, for example through a bushing located at the molten glass outlet of the melting furnace.

According to an alternative embodiment, the molten glass resulting from the furnace is transported by a pipeline from the melting furnace, that is to say from a molten glass outlet of the furnace, toward a bushing for the spinning of the molten glass into stream(s).

In the present context, the term "bushing" refers to any spinning device which makes it possible to produce one or more molten glass streams from a molten glass bath. The bushing can be provided in several embodiments, such as a pierced metal plate. The bushing can itself be heated, for example electrically, in order to prevent the extrusion/spinning perforation or perforations from being partially or completely blocked by (partially) solidified, indeed even crystallized, glass.

As indicated above, the process according to the invention is of use in the production of a great variety of glass fiber products, in particular in the production of glass strands, of glass fiber textile products, of glass reinforcing products and of products reinforced by means of glass fibers, glass fiber geotextiles, glass fiber filters, or also acoustic insulation and/or thermal insulation and/or fire-protection products based on glass fibers.

The present invention also relates to a plant capable of being used in the implementation of the manufacturing process according to the invention.

The plant comprises a glass melting furnace and a conversion unit for the conversion of molten glass into a glass fiber product.

The melting furnace of the plant is intended to produce molten glass from solid materials. It comprises a molten glass outlet, an outlet for flue gases and at least one burner for the combustion of a fuel with a rich oxidizer, that is to say an oxidizer having an oxygen content of 80 vol % to 100 vol %.

The melting furnace generally comprises several burners of this type.

As already indicated above, the melting furnace can also comprise other heating devices complementing the at least one abovementioned burner.

The transformation unit of the plant comprises a device, known as bushing, for the spinning of molten glass resulting from the melting furnace into at least one stream, the bushing being more particularly connected fluidically to the molten glass outlet of the melting furnace.

The transformation unit also comprises an attenuation device for the attenuation of the at least one stream resulting from the bushing into one or more filaments, a sizer for the sizing of the filament or filaments, a collector for the collecting of the sized filament or filaments, an assembly for the production of a glass fiber product from the collected sized filament or filaments and a desizing furnace for the desizing of the glass fiber product.

The transformation unit also optionally comprises a dryer for the drying of the filament or filaments and/or a chamber for texturing the filament or filaments or strands containing them.

The attenuation device of the plant is advantageously appropriate for the implementation of any one of the attenuation processes mentioned above. Thus, the attenuation device can comprise:
- one or more mechanical attenuation devices, such as winders or analogous appliances, or
- one or more burners for flame attenuation, or
- one or more gas current generators for the gas attenuation, it being known that said gas current generators can be burners generating combustion gas currents used as attenuation gas currents.

The attenuation device can also comprise a combination of a centrifuge for the centrifugal attenuation with one or more gas current generators for the gas attenuation of the streams resulting from the centrifuge, it being possible for said generators, as indicated above, to be burners.

When the attenuation device produces one or more continuous filaments, the collector can be a winder or another device for the winding of the filament or filaments. It is thus possible to use a winder both as mechanical attenuation device and collector.

The collector can also be a conveyor on which the filament or filaments are collected. Such a conveyor is particularly indicated when the stream or streams are attenuated to give a large number of filaments, in particular to give a large number of short filaments.

The plant according to the invention is designed so as to make possible a high energy efficiency of the melting furnace and also an energy synergy between the melting furnace and the conversion unit located downstream of the furnace.

To this end, the plant comprises a heat-exchange assembly for the heating of air by heat exchange with flue gases discharged from the furnace and for the preheating of a combustion reactant by heat exchange with the hot air thus obtained. Preheated combustion reactant and moderated air are thus obtained. The heat-exchange assembly is fluidically connected to a source of air, to the flue gas outlet of the furnace and to a source of combustion reactant, the latter source being a source of rich oxidizer or a source of gaseous fuel. The heat-exchange assembly exhibits a moderated air outlet and a preheated reactant outlet.

The preheated combustion reactant outlet of the heat-exchange assembly is fluidically connected to one or more burners of the melting furnace in order to make possible the use of the preheated reactant as combustion reactant in the melting furnace.

According to the invention, the moderated air outlet of the heat-exchange assembly is fluidically connected to the desizing furnace so as to make it possible to bring the glass fiber product into contact with moderated air inside the desizing furnace and/or so as to make possible the use of moderated air resulting from the heat-exchange assembly as oxidant for the heating of the desizing furnace by combustion.

Preferably, the moderated air outlet of the heat-exchange assembly is fluidically connected to the desizing furnace so as to make it possible to bring the glass fiber product into contact with moderated air inside the desizing furnace.

Given the flow rate and the temperature of the moderated air at the secondary exchanger outlet, the use of this moderated air to promote the thermal desizing of the glass fiber product has proved to be particularly effective and thus makes it possible to significantly improve the energy efficiency of the overall process.

In the present context, two elements are "fluidically connected" when they are connected by a pipe or a pipeline so as to make possible the flow of a fluid from one of the two elements toward the other of the two elements through this pipe or pipeline.

The source of air can, for example, be an air blower.

The heat-exchange assembly preferably makes possible at least the preheating of a rich oxidizer, indeed even the preheating of a rich oxidizer and of a gaseous fuel.

The source of rich oxidizer can, for example, be a unit for the separation of the gases of the air or a pipeline or tank for a liquefied rich oxidizer.

The heat-exchange assembly usefully comprises a first heat exchanger, referred to as "primary exchanger" or "primary heat exchanger", for heat exchange between the flue gases discharged from the melting furnace and the air to be heated, and also a second heat exchanger, referred to as "secondary heat exchanger" or "secondary exchanger", for heat exchange between the hot air resulting from the primary exchanger and the reactant to be preheated. In this case, the primary exchanger is fluidically connected to the source of air and to the flue gas outlet of the melting furnace. The secondary exchanger is fluidically connected to the source of reactant to be preheated. The secondary exchanger also exhibits the preheated combustion reactant outlet and the moderated air outlet.

According to an embodiment which makes possible the preheating of a rich oxidizer and of a gaseous fuel, the heat-exchange assembly comprises a first and a second secondary exchanger, the first secondary exchanger being fluidically connected to a source of rich oxidizer and the second secondary exchanger being fluidically connected to a source of a gaseous fuel.

As already indicated above, the plant can comprise two secondary exchangers upstream of the burner: a secondary exchanger for the preheating of a rich oxidizer and a secondary exchanger for the preheating of a gaseous fuel, the burner receiving preheated rich oxidizer from the first of the two secondary exchangers and preheated gaseous fuel from the second of the two secondary exchangers. These two secondary exchangers can be positioned in series or in parallel with respect to the flow of the hot air resulting from the primary exchanger.

Depending on the nature of the glass fiber product, the assembly for the production of a glass fiber product from the collected filament or filaments can include one or more of the following appliances: cutting appliances, strand-forming appliances, twisting appliances, texturing appliances, covering appliances, braiding appliances, weaving appliances and knitting appliances.

Depending on the use envisaged for the glass fiber product, the plant according to the invention can comprise a finishing unit downstream of the desizing furnace, for example in order to carry out one of the finishing processes described above with respect to the process according to the invention.

The furnace can be a melting/refining furnace as described above.

The bushing can be located at the molten glass outlet of the melting furnace. The plant can also comprise a pipeline for the transportation of molten glass from this molten glass outlet toward the bushing.

The invention also covers a plant as described above which also corresponds to a plant as defined in the unpublished patent application FR 1 557 344.

Thus, the moderated air outlet of the heat-exchange assembly can also be fluidically connected to one or more of the following devices of the conversion unit:
- the attenuation device: for the production of an attenuation flame or of a gas attenuation current by means of moderated air resulting from the heat-exchange assembly;
- the sizer, if present: for the use of moderated air resulting from the heat-exchange assembly as agent for spraying the binder;
- the crosslinking chamber, if present: for the use of moderated air resulting from the heat-exchange assembly for the promotion of the crosslinking, in particular by bringing sized filaments into contact with moderated air resulting from the heat-exchange assembly;
- the dryer, if present: for the use of moderated air resulting from the heat-exchange assembly as drying agent in contact with the filament or filaments or strands containing them;
- the texturing chamber, if present: for the use of moderated air resulting from the heat-exchange assembly as texturing gas current and more particularly as texturing air turbulent jet.

According to a preferred embodiment of such a plant, the attenuation device comprises an attenuation burner for producing an attenuation flame or for producing an attenuation gas current by the combustion of a fuel with moderated air resulting from the heat-exchange assembly, said attenuation burner then being fluidically connected with the moderated air outlet of the heat-exchange assembly.

According to a particularly preferred embodiment, the attenuation device comprises a centrifuge for the centrifugal attenuation of the stream or streams, and also an attenuation burner for the gas attenuation of the filaments resulting from the centrifuge. In this case, the attenuation burner is advantageously annular, capable of generating an attenuation gas current around the centrifuge and fluidically connected to the moderated air outlet of the heat-exchange assembly for the provision of moderated air as oxidant to the attenuation burner.

The plant according to the invention usefully comprises a hood surrounding the attenuation device. This hood can also surround the sizer and/or the dryer. When the plant is intended to produce a large number of short filaments, the hood makes it possible to prevent or to limit filaments from taking flight during the operation of the plant. The hood also more generally makes it possible to better control the attenuation conditions, indeed even the sizing and/or drying conditions.

When the plant is intended to produce a large number of short filaments, the collector is preferably located below or at the bottom of the hood.

The plant according to the invention can be of use in the production of a great variety of glass fiber products, in particular in the production of glass strands, of glass fiber textile products, of glass reinforcing products and of products reinforced by means of glass fibers, glass fiber geotextiles, glass fiber filters, or also acoustic insulation and/or thermal insulation and/or fire-protection products based on glass fibers, and the like.

BRIEF DESCRIPTION OF THE FIGURES

FIG. 1 illustrates a diagrammatic representation of a process and of a plant for the manufacture of a continuous glass fiber strand and more particularly a reinforcing strand and also for the manufacture of a product reinforced by means of this reinforcing strand.

DETAILED DESCRIPTION OF THE INVENTION

The present invention and its advantages are illustrated in the example below, reference being made to FIG. 1, which is a diagrammatic representation of a process and of a plant for the manufacture of a continuous glass fiber strand and more particularly a reinforcing strand and also for the manufacture of a product reinforced by means of this reinforcing strand. Such a glass fiber strand can also be used in the production of glass fiber fabrics or of reinforcing fiber.

The plant illustrated in FIG. 1 comprises a glass melting furnace 10 heated by a number of burners 12 (just one burner is shown in the figure). To this end, rich oxidizer 28a, typically a gas containing between 95 vol % and 100 vol % of oxygen, and a gaseous fuel 29a, such as natural gas, are supplied to said burners 12.

A bushing 51 heated by electrical means is located at the molten glass outlet of the furnace 10. The molten glass stream 55 produced by the bushing 51 is cooled inside the hood 50 so that, at the bottom of said stream, a rod of solidified glass is obtained. The attenuation burner 54 generates an attenuation flame 57 at the lower end of this rod inside the hood 50. The attenuation flame 57 renders the end of the rod malleable. The glass, thus malleable, is attenuated to give a continuous filament 56 by the combustion gases of the flame 57. The filament is subsequently sized by the sizing drum 52 before entering the strand-forming device 53. The device produces glass fiber strands by strand formation from several sized filaments 56. The glass strand 61 thus obtained is introduced into a first desizing furnace 60b for the partial desizing by volatilization of the strand 61. The partially desized strand is subsequently introduced into a second desizing furnace 60a in which the strand is subjected to desizing by combustion. The desized strand 62 is subsequently covered with an adhesive agent by means of the drum 70 in order to be subsequently supplied to a unit for the production of products reinforced with glass strands where the strand will either be incorporated in a matrix to be reinforced or fixed to a material to be reinforced.

According to the invention, the flue gases or combustion gases generated by the combustion of the fuel 29a with the rich oxidizer 28a are discharged from the melting furnace 10 and introduced into a primary exchanger 20 in order to heat the compressed air 24 supplied by the compressor 23. Downstream of the primary exchanger 20, the flue gases are discharged through the chimney 11, typically after having been subjected to a treatment for removal of pollutants. The hot air 25 resulting from the primary exchanger 20 is introduced into a first secondary exchanger 21 for the preheating of the rich oxidizer 28a and subsequently, in the form of partially moderated air 26, into a second secondary exchanger 22 for the preheating of the gaseous fuel 29a. The preheated rich oxidizer 28b resulting from the first secondary exchanger 21 and the preheated gaseous fuel 29b resulting from the second secondary exchanger 22 are supplied to the burners 12 as combustion reactants.

This makes possible a first very significant saving in energy in the manufacturing process according to the invention.

The residual heat present in the moderated air 27 resulting from the secondary exchangers 21, 22 is made use of in order to improve the energy efficiency of the conversion process downstream of the melting furnace 10.

Thus, moderated air 27 is introduced into the desizing furnaces 60b and 60a, in which the moderated air 63b and 63a sweeps the glass strands. In the furnace for desizing by volatilization 60b, the moderated air 63b thus discharges the volatilized components from the desizing furnace 60b. In the furnace for desizing by combustion 60a, the moderated air 63a acts as oxidant for the combustion of the size and discharges the combustion products from the desizing furnace 60a.

In the embodiment illustrated, the desizing furnaces 60a and 60b are electrically heated. It is also possible to at least partially heat a desizing furnace by combustion.

In this case, it is advantageous to use moderated air resulting from the heat-exchange assembly as oxidant for the heating of the desizing furnace.

Another portion 38 of the moderated air 27 is used as oxidant in the attenuation burner 54 which generates the attenuation flame 57.

The embodiment illustrated can, for example, advantageously be employed with a melting furnace which produces 100 tpd (tonnes per day) of reinforcing fiber. The melting furnace is heated by means of 10 oxygen burners each delivering a power of 500 kW on average. A contribution of electrical energy of the order of 100 kWe to 2 MWe may be necessary according to the production conditions.

The molten glass flows into four distribution channels which are maintained at temperature using 50 gas burners per channel.

The combustion flue gases exit from the melting furnace at 1350° C. and reheat the air to a temperature of 710° C. The 500 $Sm^3/h$ of natural gas are preheated to 450° C. and the 1000 $Sm^3/h$ of oxygen are preheated to 550° C.

The 3000 $Sm^3/h$ of air exit cooled to 400° C. at the outlet of the secondary exchangers.

At the outlet of each channel, the glass flows through orifices in an electrically heated bushing, thus forming a row of 100 filaments.

The solidified filaments are subsequently attenuated by hot gases emanating from a row of attenuation burners.

A series of 2 to 3 sizing drums are positioned per channel for the sizing of the continuous filaments thus obtained.

The filaments are subsequently, depending on the use envisaged for them, converted into glass fiber products, such as, for example, strand formation with production of glass strands, weaving with production of glass fabrics, and the like, which conversion requires the presence of size on the filaments.

The glass fiber product is subsequently successively introduced into the two desizing furnaces, first into the furnace for desizing by volatilization at temperatures between 250° C. and 380° C., for a partial desizing of the product, and subsequently into the furnace for desizing by combustion at higher temperatures between 475° C. and 820° C., for the final desizing of the product.

The desized product is subsequently, often after a finishing as described above, used for the final application thereof, for example as reinforcing product.

The desizing furnaces are fed with a moderated air current at 300° C. which sweeps the glass fiber product and discharges the desizing products from the furnace, the moderated air being partially cooled by loss of heat (generally from 10° C. to 100° C.) during the transportation between the heat-exchange assembly and the desizing furnaces.

The use of moderated air resulting from the heat-exchange assembly in the desizing of the glass fiber product makes possible a major optimization of the sizing process by significantly lowering the energy consumption of the desizing furnaces and/or by reducing the duration of the desizing, this being achieved with a minimum of additional equipment, essentially pipelines connecting the moderated air outlet of the heat-exchange assembly and the desizing furnaces.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur, Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A process for the manufacture of a glass fiber product in which molten glass is converted into a glass fiber, comprising the step of:

the molten glass is produced in a melting furnace heated by combustion of a fuel with a rich oxidizer having an oxygen content of 80 vol % to 100 vol %, with generation of heat and flue gases, said generated flue gases being discharged from the melting furnace at a temperature between 1000° C. and 1600° C.;

spinning the molten glass into at least one stream;

attenuating the at least one stream into one or more filaments;

sizing the filament or filaments;

collecting the filament or filaments;

producing the glass fiber product by means of the collected sized filament or filaments;

thermal desizing of the glass fiber product;

air is heated by heat exchange with discharged flue gases in a heat-exchange assembly with hot air being obtained;

a reactant chosen from rich oxidizers and gaseous fuels is preheated by heat exchange with the hot air in the heat-exchange assembly with the production, on the one hand, of preheated reactant and, on the other hand, of moderated air at a temperature between 200° C. and 500° C., wherein the preheated reactant is used as combustion reactant in the melting furnace; and bringing the moderated air into contact with the glass fiber product during the desizing thereby volatilizing and/or combusting the size present on the glass fiber product resulting from said step of sizing the filament or filaments.

2. The process of claim 1, wherein the heat-exchange assembly comprises a primary exchanger and a secondary exchanger, air being heated by heat exchange with flue gases discharged from the furnace in the primary exchanger, with hot air at a temperature between 500° C. and 800° C. being obtained, and the combustion reactant is preheated in the secondary exchanger by heat exchange with hot air resulting from the primary exchanger.

3. The process of claim 1, wherein the thermal desizing stage comprises a stage of desizing by volatilization and/or a stage of desizing by combustion.

4. The process of claim 1, wherein the desizing stage comprises a stage of desizing by volatilization at a temperature between 250° C. and 380C.

5. The process of claim 1, wherein the desizing stage comprises a stage of desizing by combustion at a temperature between 475° C. and 820C.

6. The process of claim 1, in which the desized glass fiber product is subjected to a finishing stage.

7. The process of claim 1, in which the glass fiber product is chosen from strands, textile products, reinforcing products, products reinforced by means of glass fibers, acoustic insulation products, thermal insulation products and fire-protection products.

8. A plant comprising a glass melting furnace, a conversion unit for the conversion of molten glass into a glass fiber product, and a heat-exchange assembly for the heating of air by heat exchange with flue gases discharged from the melting furnace and for the preheating of a combustion reactant by heat exchange with hot air, wherein:

the melting furnace comprises a molten glass outlet, an outlet for flue gases and at least one burner for the combustion of a fuel with a rich oxidizer having an oxygen content of 80 vol % to 100 vol %, the preheated combustion reactant being selected from the fuel and the rich oxidizer;

the conversion unit comprises:

a bushing for the spinning of molten glass resulting from the melting furnace into at least one stream, said bushing being fluidically connected to the molten glass outlet of the furnace;

an attenuation device for the attenuation of at least one stream resulting from the bushing into one or more filaments;

a sizer for the sizing of the filament or filaments;

a collector for the collecting of the sized filament or filaments;

an assembly for the production of a glass fiber product from the collected filament or filaments; and a desizing furnace for the desizing of the glass fiber product; and the heat-exchange assembly is adapted and configured to heat air by heat exchange with flue gases discharged from the furnace so as to produce hot air;

the heat-exchange assembly is further adapted and configured to preheat the reactant by heat exchange with the hot air so as to produce moderated air and the preheated reactant;

the heat-exchange assembly is fluidically connected to a source of air, to the flue gas outlet of the melting furnace and to a source of a combustion reactant chosen between rich oxidizer and gaseous fuel;

the preheated combustion reactant outlet of the secondary exchanger is fluidically connected to the burner of the melting furnace; and the heat-exchange assembly includes a preheated combustion reactant outlet that is fluidically connected to the burner of the melting furnace and also a moderated air outlet fluidically connected to the desizing furnace in order to bring moderated air into contact with the glass fiber product in the desizing furnace and/or to use moderated air as oxidant for the heating of the furnace for desizing by combustion.

9. The plant of claim 8, wherein the moderated air outlet of the heat-exchange assembly is fluidically connected to the desizing furnace in order to bring moderated air into contact with the glass fiber product in the desizing furnace.

10. The plant of claim 8, wherein the heat-exchange assembly comprises a primary exchanger for heat exchange between the flue gases discharged from the furnace and the air and a secondary exchanger for heat exchange between the heated air resulting from the primary exchanger and the combustion reactant.

11. The plant of claim 8, wherein the heat-exchange assembly is fluidically connected to a source of rich oxidizer, preferably to a source of rich oxidizer and to a source of the gaseous fuel.

12. The plant of claim 8, wherein the moderated air outlet is fluidically connected to a furnace for desizing by volatilization and/or to a furnace for desizing by combustion and/or to a furnace for desizing by volatilization and combustion.

13. The plant of claim 8, wherein an assembly for the production of a glass fiber product from the collected filament or filaments includes at least one appliance chosen from: cutting appliances, strand-forming appliances, twisting appliances, texturing appliances, covering appliances, braiding appliances, weaving appliances and knitting appliances.

14. The plant of claim 8, comprising a finishing unit downstream of the desizing furnace.

* * * * *